US012730202B2

(12) United States Patent
Mueller et al.

(10) Patent No.: US 12,730,202 B2
(45) Date of Patent: Sep. 8, 2026

(54) AUTO-CALIBRATING A TARGET SENSOR USING SCENE MAPPING INFORMATION FROM A REFERENCE SENSOR

(71) Applicant: Rivian IP Holdings, LLC, Plymouth, MI (US)

(72) Inventors: Martin Mueller, San Jose, CA (US); Vikram Appia, San Jose, CA (US); Gary Fay, Hermosa Beach, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 1036 days.

(21) Appl. No.: 17/710,467

(22) Filed: Mar. 31, 2022

(65) Prior Publication Data

US 2023/0314578 A1 Oct. 5, 2023

(51) Int. Cl.

| | |
|---|---|
| ***G01S 7/497*** | (2006.01) |
| ***G01S 17/89*** | (2020.01) |
| ***G06T 7/80*** | (2017.01) |

(52) U.S. Cl.

CPC ............ *G01S 7/4972* (2013.01); *G01S 17/89* (2013.01); *G06T 7/80* (2017.01)

(58) Field of Classification Search

CPC ...... G01S 7/4972; G01S 17/89; G01S 7/4026; G01S 13/87; G01S 13/931; G01S 7/4802;

(Continued)

(56) References Cited

U.S. PATENT DOCUMENTS 5,349,378 A * 9/1994 Maali ...................... G01S 7/497 348/46
10,197,400 B2 * 2/2019 Jesudason ............. G01C 21/30

(Continued)

FOREIGN PATENT DOCUMENTS

CA 3080002 C * 4/2019 .............. G06T 7/80
CN 113692521 A 11/2021

OTHER PUBLICATIONS

Teillet et al., "Radiometric cross-calibration of the Landsat-7 ETM+ and Landsat-5 TM sensors based on tandem data sets", 2000.*

(Continued)

*Primary Examiner* — Assres H Woldemaryam
(74) *Attorney, Agent, or Firm* — BAKERHOSTETLER

(57) ABSTRACT

Systems and methods for performing auto-calibration for a target sensor from information gained by a reference sensor, thereby enabling cross-sensor self-calibration for a set of sensors. A method includes the step of obtaining a first mapping of a first observable scene from a first scene sensing device and a second mapping of a second observable scene from a second scene sensing device. The first and second scene sensing devices are positioned on a test object (e.g., vehicle) in a substantially fixed relationship with respect to each other. The first and second observable scenes have common reference objects and/or overlapping portions. The method also includes comparing the common reference object and/or overlapping portion of the first mapping with the common reference object and/or overlapping portion of the second mapping to determine a difference. Also, the method includes creating calibration parameters, based on the difference, for calibrating the second scene sensing device.

21 Claims, 10 Drawing Sheets

(58) Field of Classification Search
CPC ........ G01S 17/86; G01S 17/87; G01S 17/931; G01S 7/40; G01S 7/41; G01S 7/497; G06T 7/80; G06T 2207/10028; G06T 7/85; G06T 2207/30252; G06T 7/70; G06T 2207/30261
See application file for complete search history.

(56) References Cited

U.S. PATENT DOCUMENTS 10,726,579 B1* 7/2020 Huang .................. G01S 7/4972
10,838,049 B1* 11/2020 Schwiesow ........... G01S 7/4972
11,940,539 B2* 3/2024 Diederichs ............ G01S 7/4808
12,160,559 B2* 12/2024 Swope ................. H04N 17/002
2016/0161602 A1* 6/2016 Prokhorov ............ G01S 7/4972
702/97
2016/0253793 A1* 9/2016 Marrion ................ G06T 7/0008
382/141
2016/0343136 A1* 11/2016 Heidi ........................ G06T 7/80
2017/0103509 A1* 4/2017 Scharfenberger .... H04N 17/002
2017/0287166 A1* 10/2017 Claveau .................... G06T 7/80
2017/0371348 A1* 12/2017 Mou .................... G05D 1/0257
2019/0293772 A1* 9/2019 Pfeiffer ................... G01S 17/42
2020/0116867 A1* 4/2020 Zhu .................... B60W 60/0011
2020/0282929 A1* 9/2020 Kroeger .................. G01S 7/497
2020/0363507 A1* 11/2020 Cohen ..................... G01S 7/484
2021/0051317 A1* 2/2021 Yan ........................... G06T 7/80
2021/0103040 A1* 4/2021 Chung .................... G01S 7/497
2021/0208263 A1* 7/2021 Sutavani ................. G01S 17/42
2021/0385425 A1* 12/2021 Sun ...................... H04N 13/239
2022/0118994 A1* 4/2022 Lu ............................ G06T 7/85
2022/0128995 A1* 4/2022 Chen .................... G05D 1/0212
2023/0085898 A1* 3/2023 Dijkman ............... G01S 7/2955
702/97

OTHER PUBLICATIONS

First Office Action in Chinese Patent Application No. 2022-115263235, dated Jan. 27, 2026, 13 pages including machine translation.

* cited by examiner

Landmark Probability Grid on Target Vehicle x [m] in TVF 1
0.5
0

2 1.5 1 0.5 0 y [m] in TVF 1
0.5
0

Landmark Probability Grid on Target Vehicle x [m] in TVF y [m] in TVF 1 0.5 0 2 1 0 1 0.5 0

AUTO-CALIBRATING A TARGET SENSOR USING SCENE MAPPING INFORMATION FROM A REFERENCE SENSOR

INTRODUCTION

The present disclosure generally relates to vehicle-based sensing and automation. More particularly, the present disclosure relates to self-calibrating one or more vehicle sensors in the field using scene mapping information obtained by a reference sensor.

Many vehicle manufacturers continue to develop various types of Advanced Driver-Assistance Systems (ADAS) and Autonomous Driving (AD) Systems. Generally, ADAS includes electronic technologies that can assist a driver in the operation of a vehicle. With the help from these various ADAS components, drivers can perform different types of maneuvers more safely and effectively. Also, ADAS can reduce the number of accidents and fatalities caused by human error. AD includes electronic technologies that control the operation of a vehicle with limited to no driver assistance.

ADAS and AD may use numerous human-machine interfaces, which may include sensors, alerting devices, control actuators, etc. For example, some ADAS and AD components may detect nearby obstacles and automatically respond to these detected obstacles in order to avoid an accident. Sensing devices associated with ADAS and AD may include imagining devices (e.g., cameras, lidar, radar, etc.) as well as associated image processing components (e.g., computer-based vision and detection units, in-vehicle networking units, etc.).

An example of some ADAS and AD components include electronic stability control, anti-lock brakes, blind spot monitoring systems, lane departure warning systems, traction control systems, just to name a few. ADAS and AD may also include Adaptive Cruise Control (ACC), which can automatically brake or accelerate a vehicle to maintain a chosen velocity and following-distance from a vehicle ahead. ADAS and AD may also include automatic parking functionality, automotive head-up displays, navigation systems (e.g., using the Global Positioning System (GPS)), backup cameras, collision avoidance systems, and many others.

It may be noted, therefore, that a vehicle may be equipped with many different types of sensors, which may be installed either during the vehicle manufacturing process or after market. When sensors are initially incorporated into a vehicle, they will normally be calibrated (in the factory or in a shop) to allow them to work properly and output useful sensor data. However, over the lifetime of a vehicle, some sensors may at times be affected by collisions or other forces that can move or jolt the sensors from their original calibrated position, alignment, orientation, etc. Sensors may also become displaced or misaligned by vibrational forces during the normal use of the vehicle in addition to jerking or jolting forces that may be caused by running over potholes, running over rough terrain, etc. Also, sensors can become misaligned or displaced by the loosening of screws or other elements that are used for supporting the sensors.

There may be ways to re-calibrate sensors after their initial installation in a vehicle, but usually these methods require taking the vehicle to a shop or other station where re-calibration can be performed. There are a few self-calibrating systems in use today, but they are unable to operate effectively in many different scenarios. Therefore, there is a need in the field of vehicle sensors and calibration systems for calibrating these sensors to allow more effective and comprehensive self-calibration or re-calibration of vehicle sensors in the field.

BRIEF SUMMARY

The present disclosure focuses on systems and methods for performing self-calibration or auto-calibration for a set of sensors that are arranged in a fixed orientation with respect to each other. According to one implementation, a process may include the step of obtaining a first mapping of a first observable scene from a first scene sensing device and a second mapping of a second observable scene from a second scene sensing device. The first and second scene sensing devices may be positioned on a test object in a substantially fixed relationship with respect to each other. Also, the first and second observable scenes may both include a reference object or have common overlapping portions (used interchangeably herein). The process further includes the step of comparing the reference object or common overlapping portion of the first mapping with the reference object common overlapping portion of the second mapping to determine a difference. Also, the process includes the step of creating calibration parameters, based on the difference, for calibrating the second scene sensing device. The self-calibration or auto-calibration systems and methods of the present disclosure find broad applicability in both ADAS and AD applications.

According to additional embodiments with respect to the process, the test object may be a vehicle, and the first and second scene sensing devices may be configured to observe scenes nearby the vehicle. The second scene sensing device may be calibrated while the vehicle is in operation. In some embodiments, the first scene sensing device may be directed to view a portion of a road on which the vehicle is traveling. In this case, the process may further include using characteristics of the road to perform a self-calibration procedure on the first scene sensing device.

In addition, the first and second mappings may be observed by the first and second scene sensing devices at substantially the same time. The first scene sensing device may be configured to create a feature mapping of the scene having one or more observable objects. The process may further include localizing the objects in three-dimensional (3D) space and predicting the locality of the objects in 3D space to determine the difference. The step of creating the calibration parameters may include producing roll and pitch calibration parameters.

Furthermore, the first scene sensing device may be a pre-calibrated sensor used as a reference sensor and the second scene sensing device may be a target sensor. Some calibration systems utilizing the process may further comprise one or more additional scene sensing devices. In this case, the calibrated second scene sensing device may be used as a reference sensor for the one or more additional scene sensing devices. Also, the second scene sensing device may be calibrated with respect to an initial factory-calibrated position and orientation.

The first and second scene sensing devices may include Advanced Driver-Assistance System (ADAS) and/or Autonomous Driving (AD) Systems sensors. For example, the ADAS and/or AD sensors may include one or more of cameras, image capture devices, lidar devices, and radar devices. Also, the first and second mappings may include observed scene/material reflective property maps, such as Echo-Pulse-Width (EPW) maps or the like. In addition, one or more additional sensors may be used for measuring one or more of distance and velocity to create the first and second observable scenes.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for auto-calibrating one or more vehicle sensors. Instead of relying on a re-calibration system that attempts to auto-calibrate one sensor on its own, the systems and methods of the present disclosure are configured to use a cross-sensor auto-calibration process whereby information from one reference sensor can be used to calibrate another sensor. Thus, the present disclosure addresses the problem of calibrating Advanced Driver-Assistance System (ADAS) and/or Autonomous Driving (AD) System sensors in the field (e.g., "online," on the road, etc.), as opposed to calibration that is performed in a controlled calibration station. Monitoring and estimating the location and orientation of vehicle sensors throughout the lifecycle of a vehicle may be important to ensure correct functioning of many of these ADAS and/or AD features. As mentioned above, sensor calibration parameters may change from their factory-calibrated parameters due to various factors, such as, but not limited to, collision/physical force, sensor mount wearing (e.g., screws loosening, etc.), temperature, vehicle load, tire pressure, etc. Ideally, each sensor would be able to monitor its own calibration online given its measured data. However, this can be a challenging task depending on the sensor's field of view, resolution (amount of data measured), scene/environment conditions, etc. The present disclosure addresses these challenges by providing cross-sensor calibration techniques.

Figure 1:
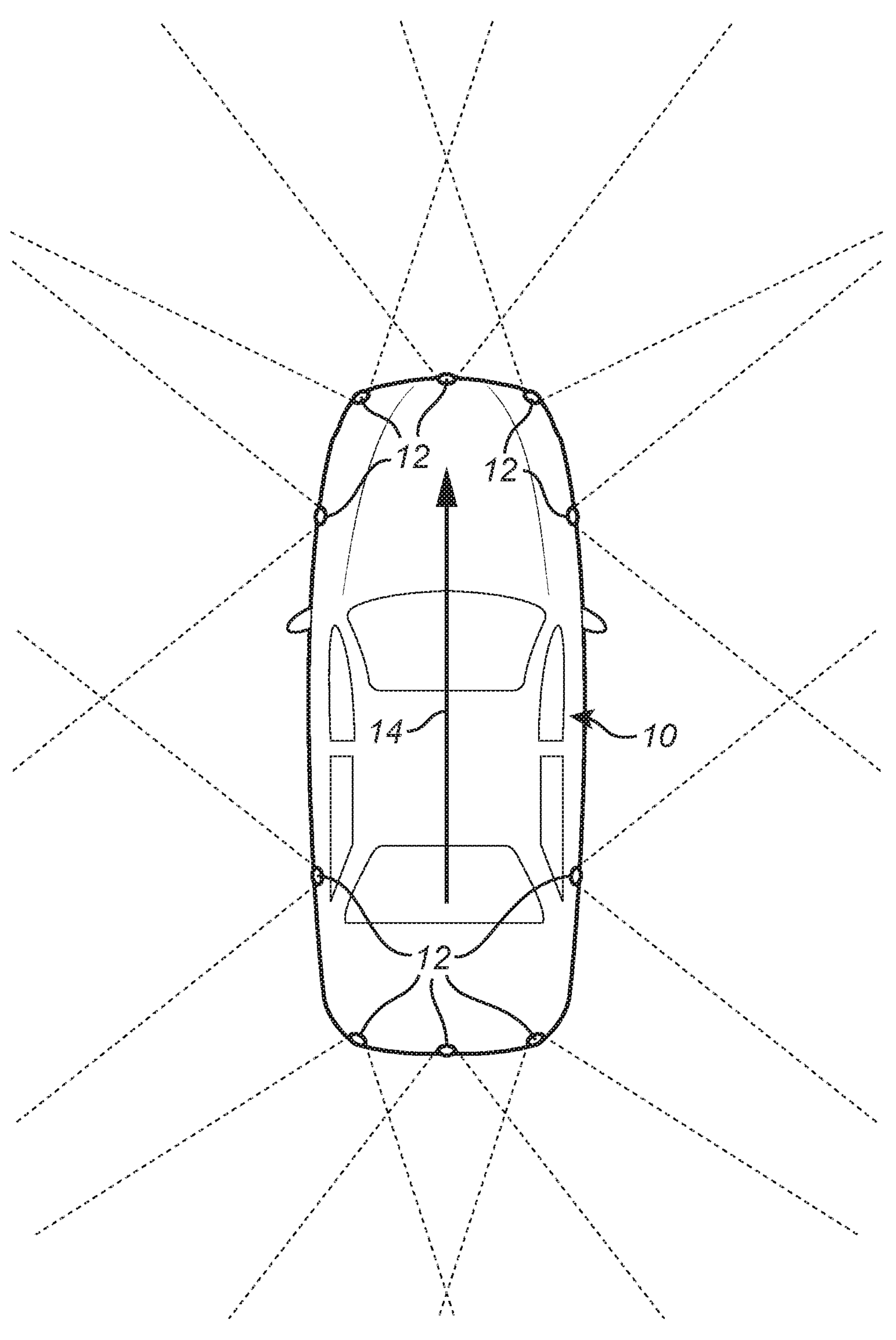
FIG. 1 is a diagram illustrating a top view of a test vehicle having a plurality of sensors oriented to view multiple scenes surrounding the test vehicle, according to various embodiments.

FIG. 1 is a top view of an embodiment of a test vehicle 10, which may also be referred to as a "vehicle," an "ego vehicle," a "vehicle of interest," a "vehicle under test," or other similar term, and should be considered as be distinguishable from other external vehicles in the nearby surroundings. In this embodiment, the test vehicle 10 includes a plurality of sensors 12 arranged at different areas on the test vehicle 10. In their initially calibrated arrangement, each of the sensors 12 may include a specific position on the test vehicle 10, a specific orientation (e.g., angle with respect to an axis 14 defined by a forward-to-back direction of the test vehicle 10), and a specific pitch (e.g., angle with respect to the horizon, although not shown in FIG. 1). It is intended that each of the sensors 12 is initially calibrated and is intended to maintain its calibrated position, orientation, and pitch for normal operation. However, over the lifetime of the test vehicle 10, the sensors 12 can be displaced and/or misaligned, as mentioned above, as a result of forces on the test vehicle 10, forces on the sensors 12 themselves, and/or forces on certain structure (e.g., bumpers, vehicle body, connectors, etc.) that are configured to physically support the sensors 12.

In addition, FIG. 1 shows the field of view of each of the sensors 12 in this example. It may be noted that the sensors 12 may sense any suitable field of view having any suitable width (e.g., side-to-side range), any suitable height (e.g., up-to-down range), and any suitable depth (e.g., distance from each of the respective sensors 12). Although FIG. 1 shows the sensors 12 arranged along an edge of the test vehicle 10 (from the perspective of the top view), it should be noted that the sensors 12 may be arranged at or connected to any suitable part of the test vehicle 10. Also, although the sensors 12 are shown in FIG. 1 as being spread out somewhat evenly around the test vehicle 10, it should be noted that, in some cases, two or more sensors 12 may be arranged immediately next to each other. Furthermore, although the sensors 12 in FIG. 1 are shown with different fields of view, it should be noted that, in some cases, two or more sensors may be arranged with the same (or similar) points of view (e.g., directed at substantially the same angle with respect to the axis 14).

In particular, it may be noted that even in embodiments where two or more sensors 12 are oriented in such a way that they have the same viewing direction (with respect to the axis 14), since these sensors 12 cannot be located in exactly the same space, the "scene" (or field of view) of each of the sensors 12 will be at least slightly different. However, when viewing certain objects, which may be located within a distal range from the test vehicle 10, two or more sensors 12 may obtain extremely similar scenes.

Figure 2:
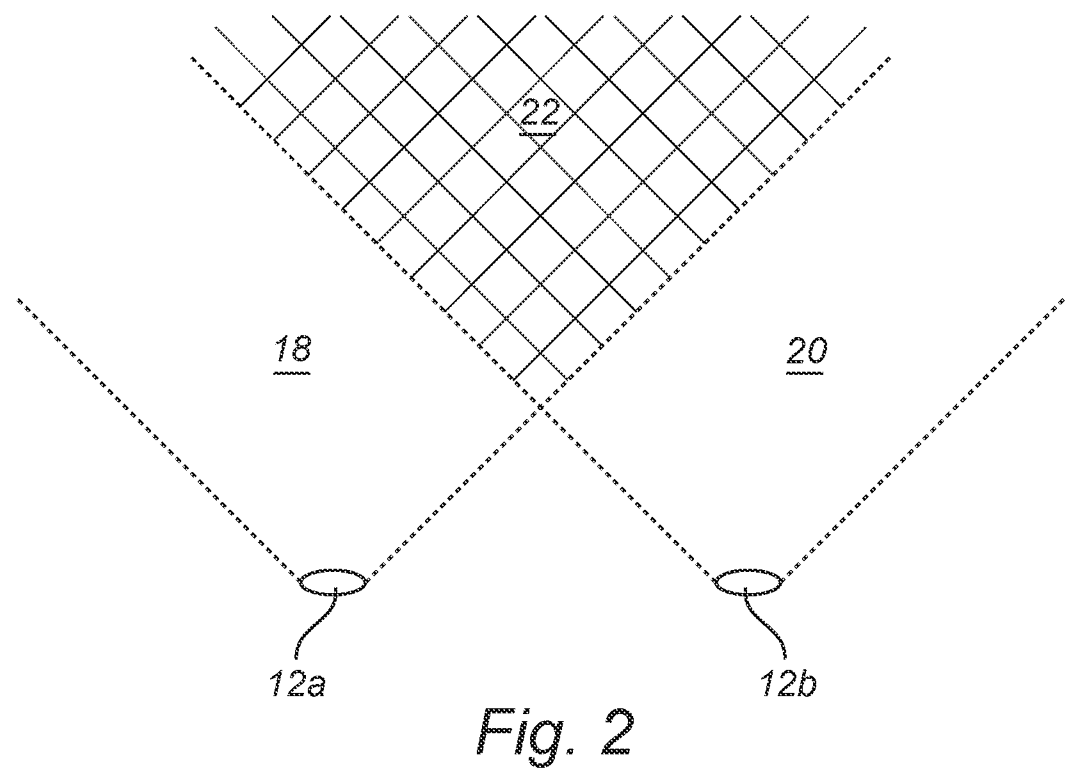
FIG. 2 is a diagram illustrating, from an overhead perspective, the viewing scope of an adjacent pair of the sensors shown in FIG. 1, according to various embodiments.

FIG. 2 is a diagram illustrating a first sensor 12*a* and a second sensor 12*b* from an overhead perspective, according to one embodiment. The first sensor 12*a* and second sensor 12*b* may represent two adjacent sensors 12 positioned on the vehicle 10 of FIG. 1. In other environments, the first and second sensors 12*a*, 12*b* may represent any image sensing or scene sensing devices. The first sensor 12*a* includes a first viewing scope 18 and the second sensor 12*b* includes a second viewing scope 20. The reference object or area that is common to both the first viewing scope 18 and the second viewing scope 20 may be referred to as an overlapping scope 22. The viewing scopes 18, 20 and overlapping scope 22 may be the spaces that are observable from the perspective of one or more of the sensors 12*a*, 12*b*, where the respective sensors 12*a*, 12*b* can detect objects, including common objects, that are in these spaces. The first and second sensors 12*a*, 12*b* may be any suitable types of devices, such as cameras, image sensing devices, lidar devices, radar devices, etc.

Figure 3:
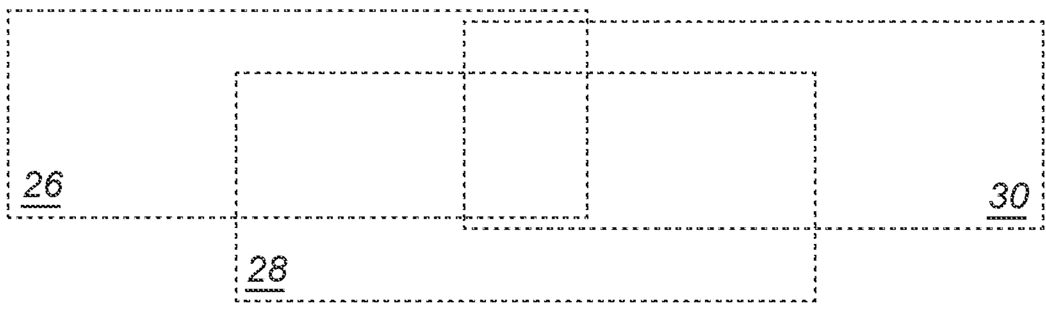
FIG. 3 is a diagram illustrating overlapping scenes from the perspective of a number of the sensors shown in FIG. 1, according to various embodiments.

FIG. 3 is a diagram showing an embodiment where three adjacent sensors (not shown) include view scopes 26, 28, 30 having various overlapping scenes. This example is shown from the perspective of the three sensors (e.g., sensor 12 shown in FIG. 1). With overlapping viewing areas, the scene acquired by one of the sensors that may be used as a reference can be compared with a scene acquire by a sensor to be calibrated. If the common scene does not match, calibration mechanisms may be used to calibrate the sensor. This calibrated sensor may then be used as a reference for the next sensor. This process can be repeated for an entire set of sensors as long as each adjacent pair includes overlapping scenes. Instead of overlapping scenes, a reference object may also be identified and compared in scenes captured by different sensors at different times, such as by subsequent sensors as a vehicle travels, with a first scene captured by a first sensor first capturing the reference object and a second scene captured by a second sensor second capturing the reference object.

Figures 4, 5:
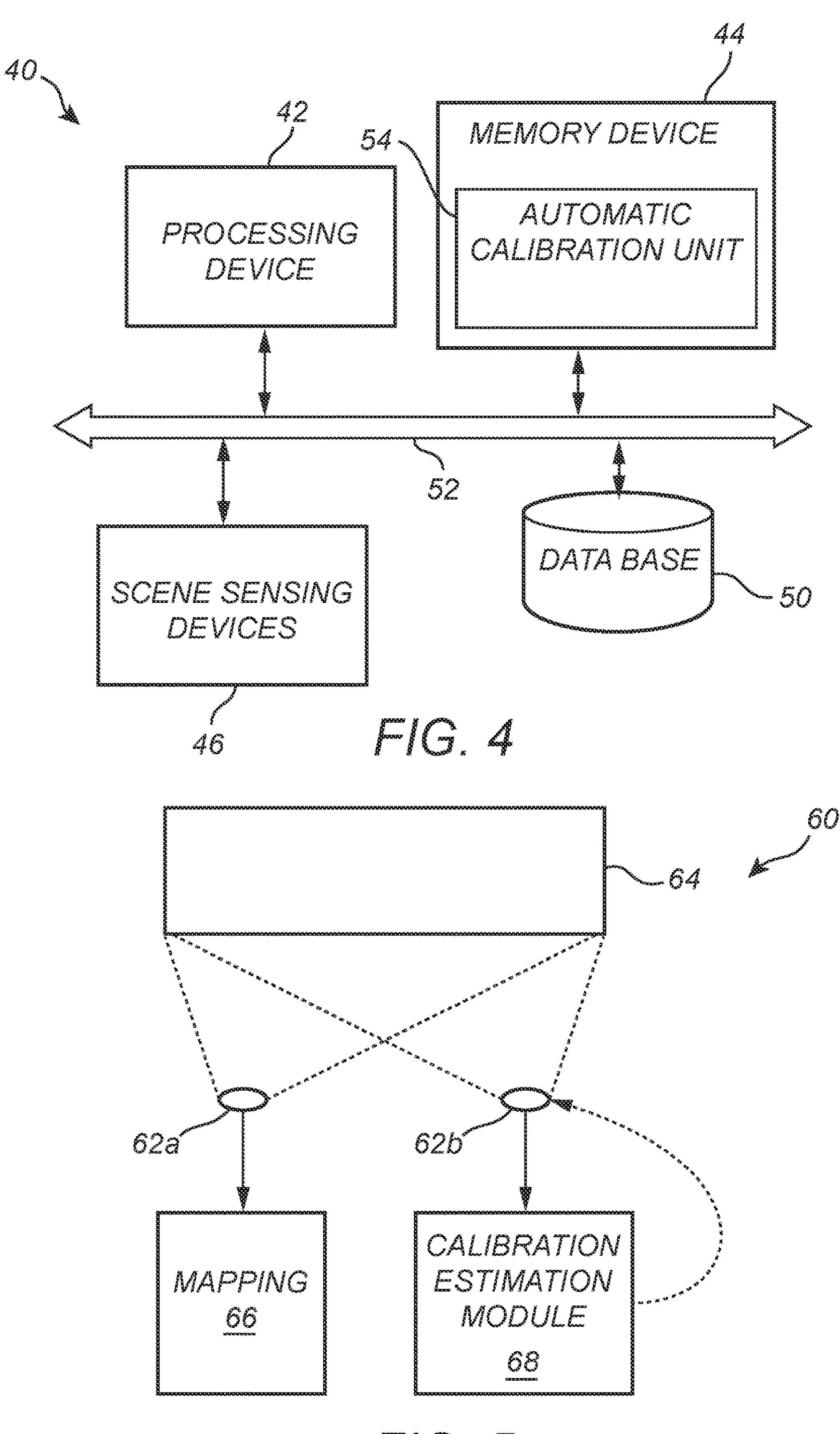
FIG. 4 is a block diagram illustrating a system for automatically performing self-calibration of the sensors shown in FIG. 1, according to various embodiments.
FIG. 5 is a diagram illustrating a cross-sensor calibration technique, according to various embodiments.
Figure 6A:
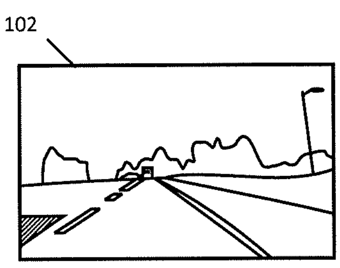
FIGS. 6A-6F are graphs illustrating sample sets of sensor information obtained over a period of time by two adjacent sensors and comparison parameters thereof, according to various embodiments.
Figure 6A:
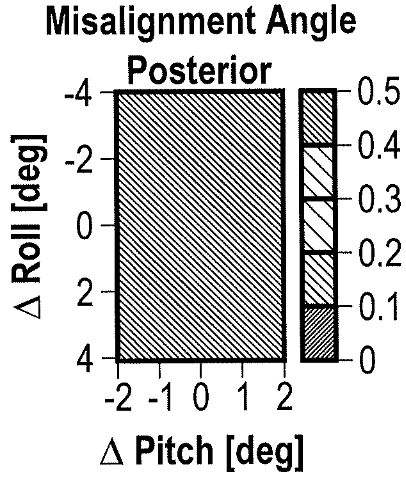
Figure 6A:
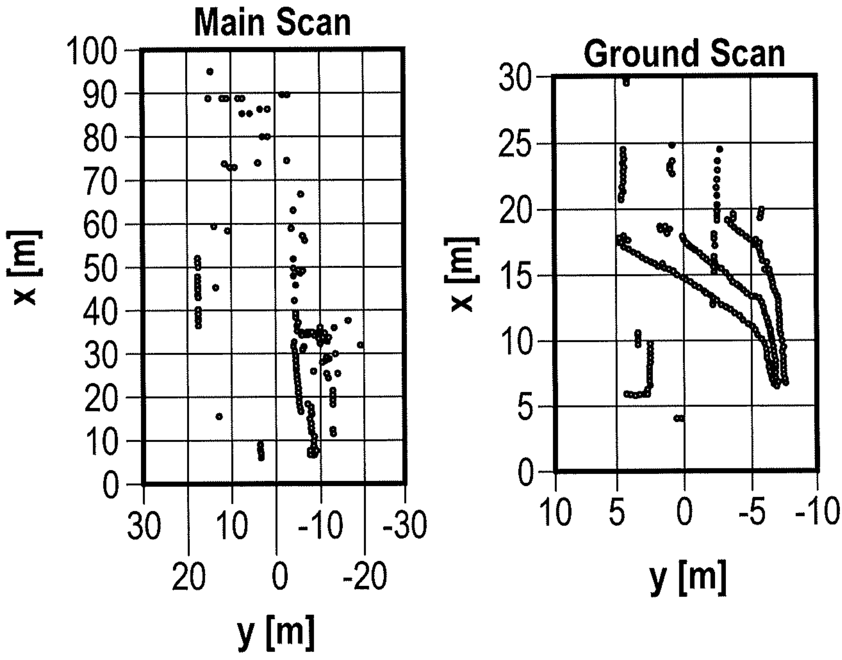
Figure 6B:
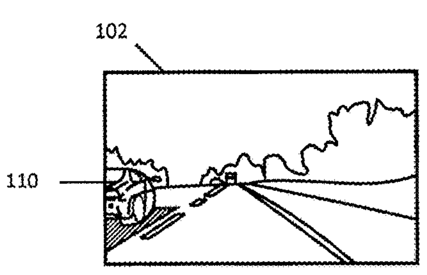
Figure 6B:
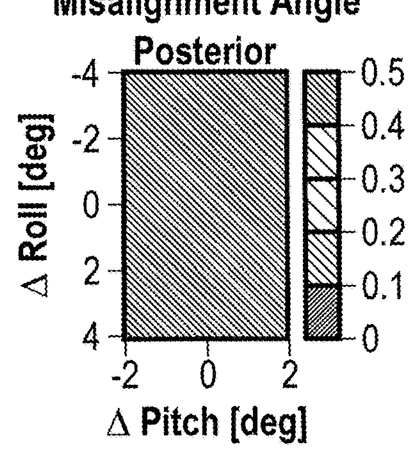
Figure 6B:
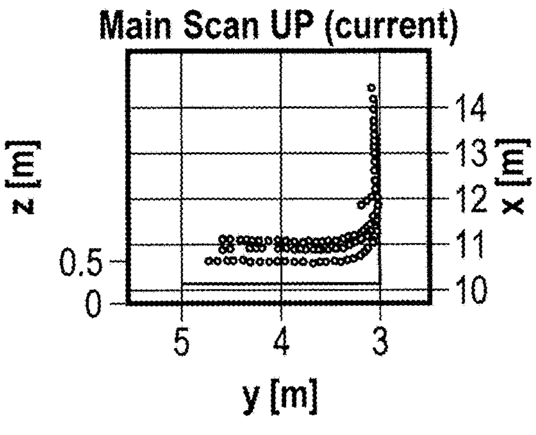
Figure 6B:
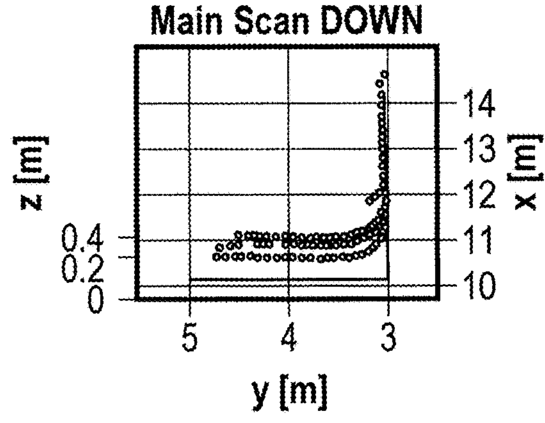
Figure 6B:
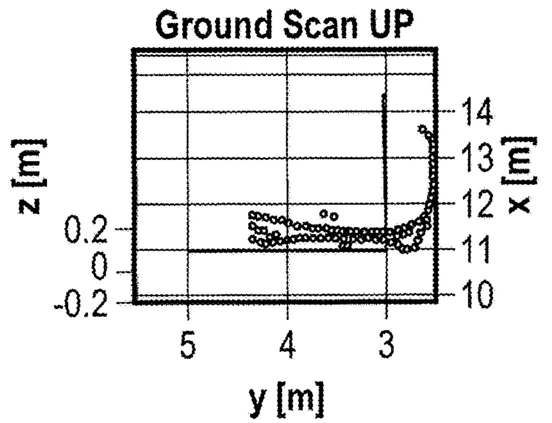
Figure 6B:
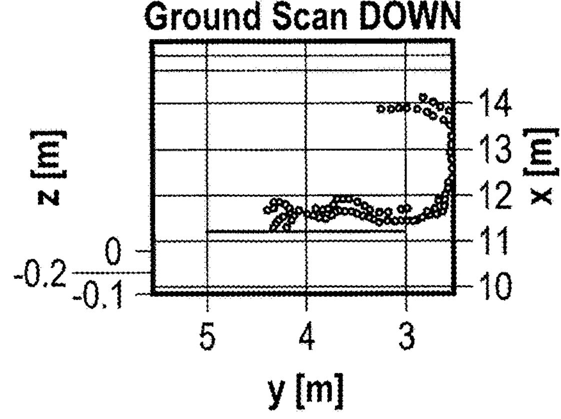
Figure 6C:
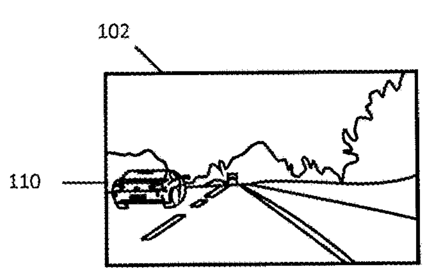
Figure 6C:
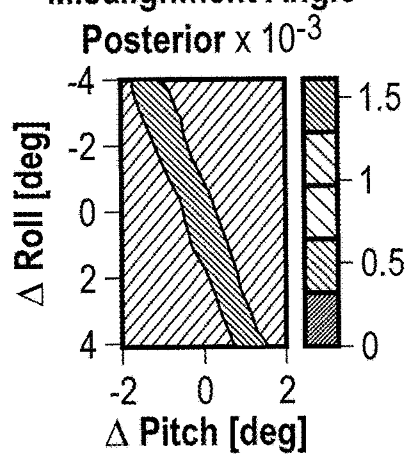
Figure 6C:
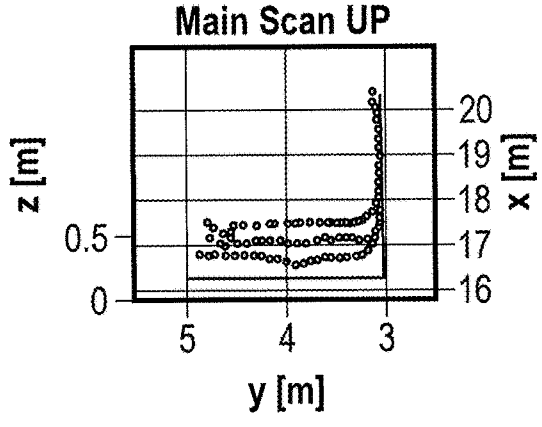
Figure 6C:
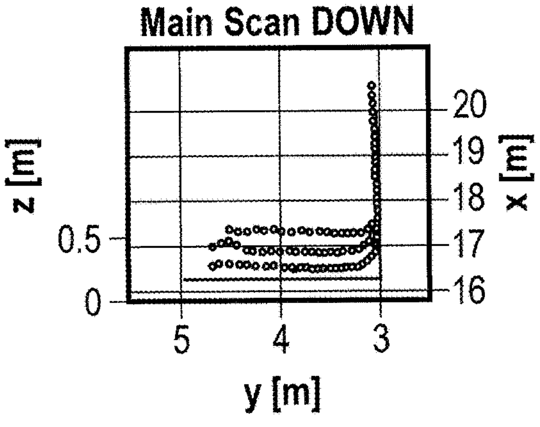
Figure 6C:
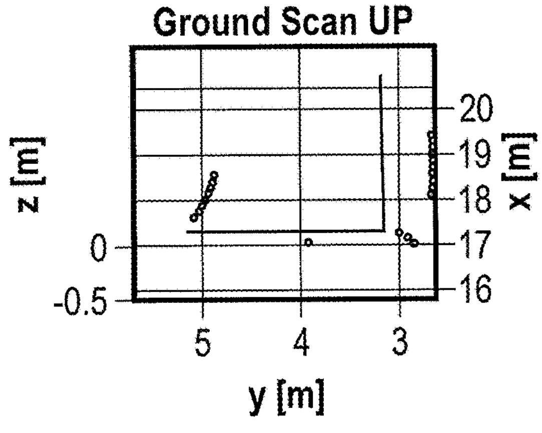
Figure 6C:
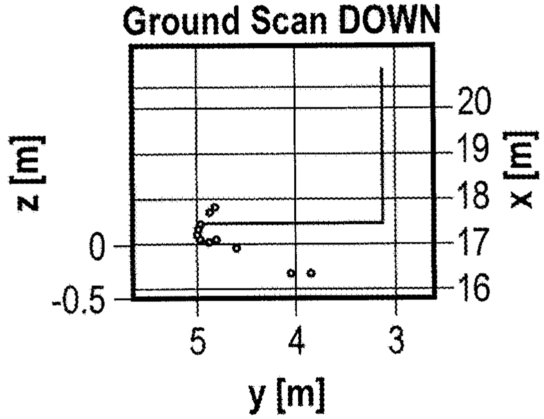
Figure 6D:
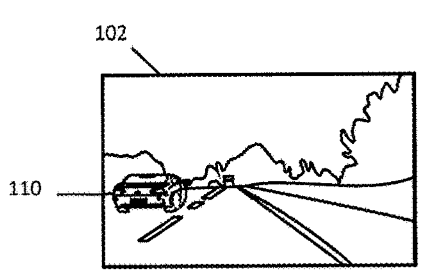
Figure 6D:
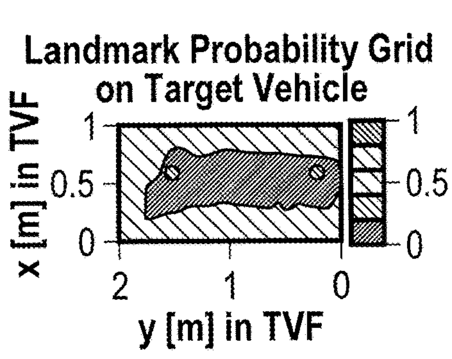
Figure 6D:
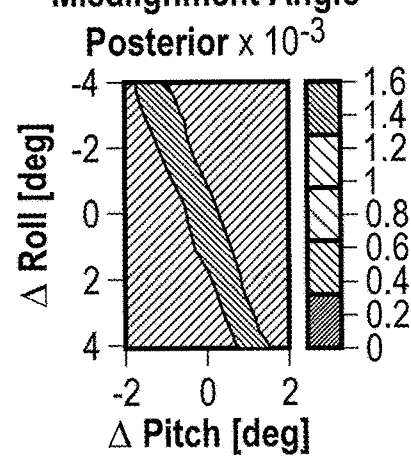
Figure 6D:
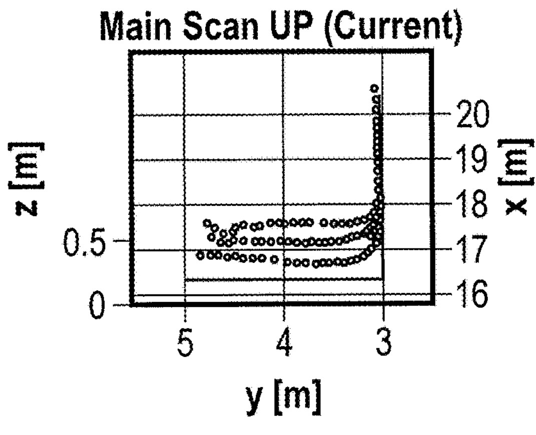
Figure 6D:
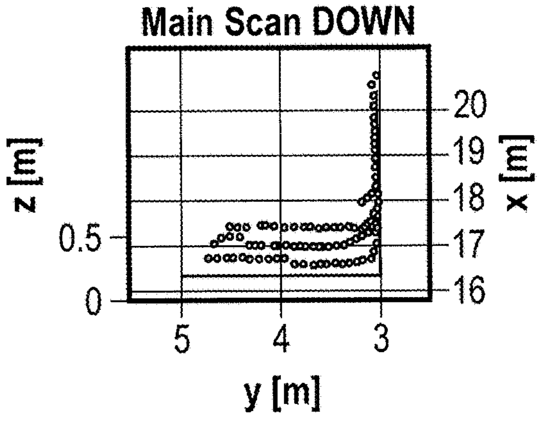
Figure 6D:
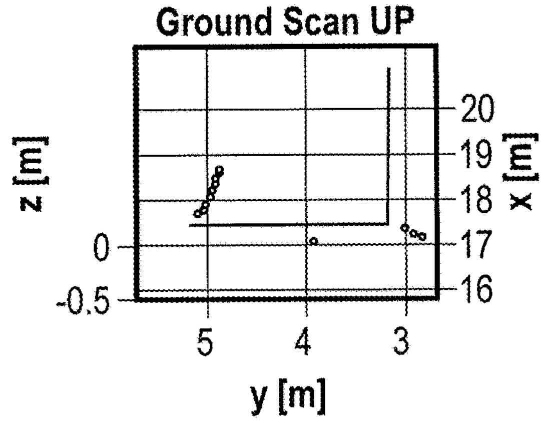
Figure 6D:
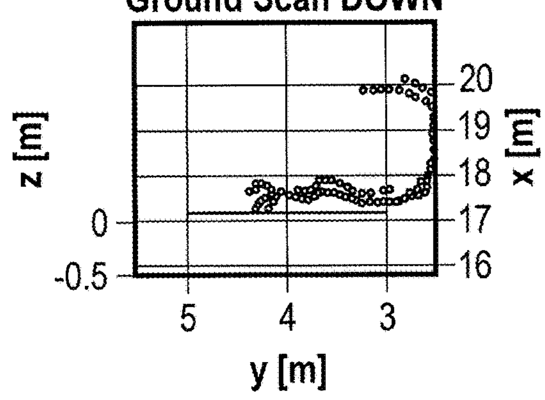
Figure 6E:
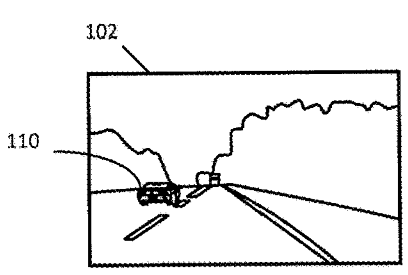
Figure 6E:
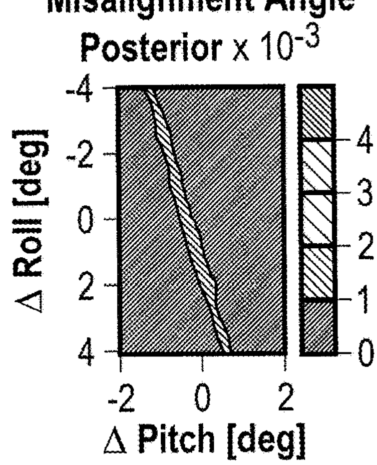
Figure 6E:
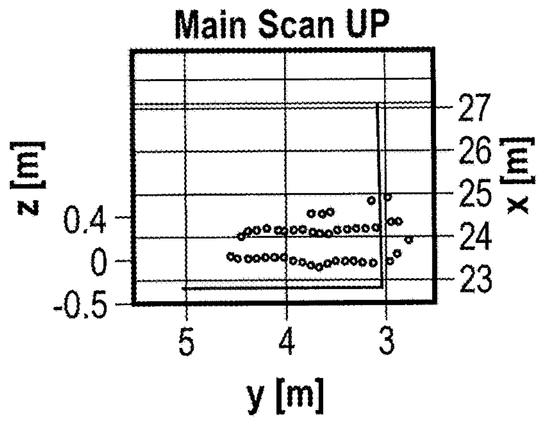
Figure 6E:
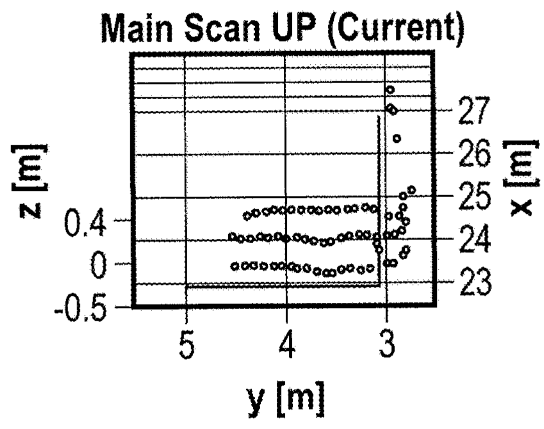
Figure 6E:
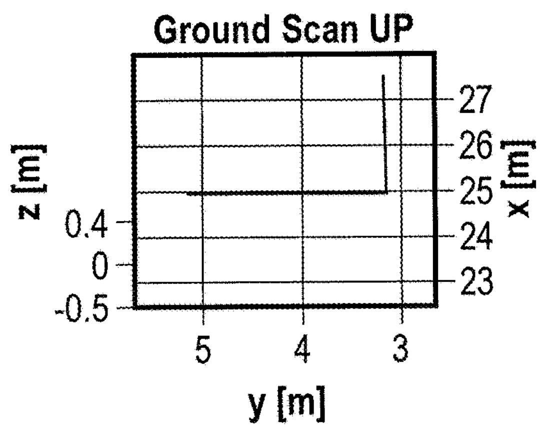
Figure 6E:
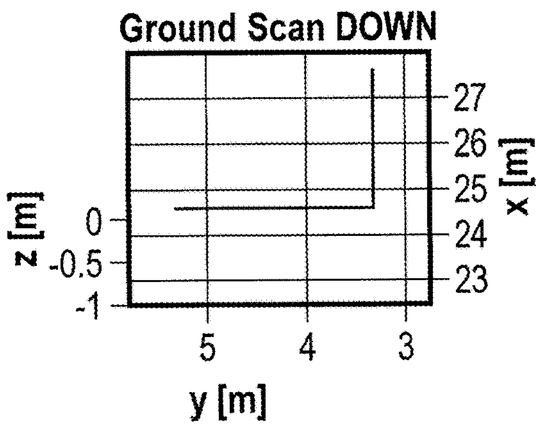
Figure 6F:
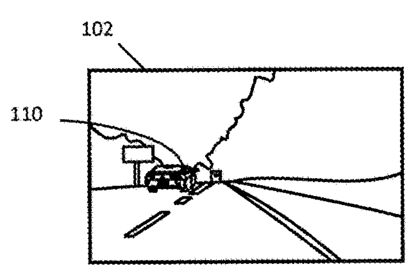
Figure 6F:
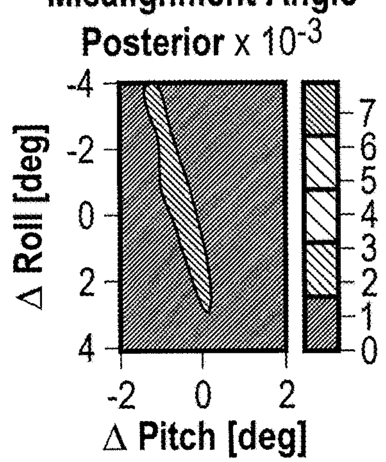
Figure 6F:
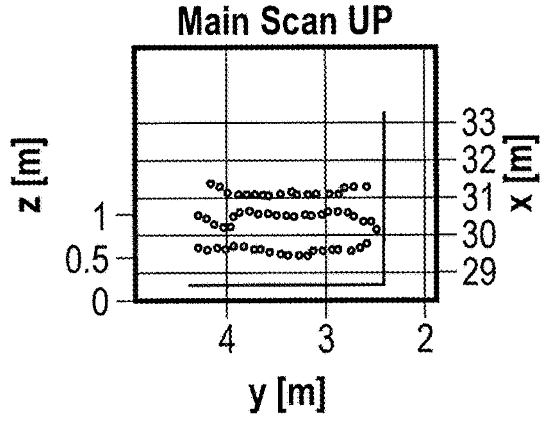
Figure 6F:
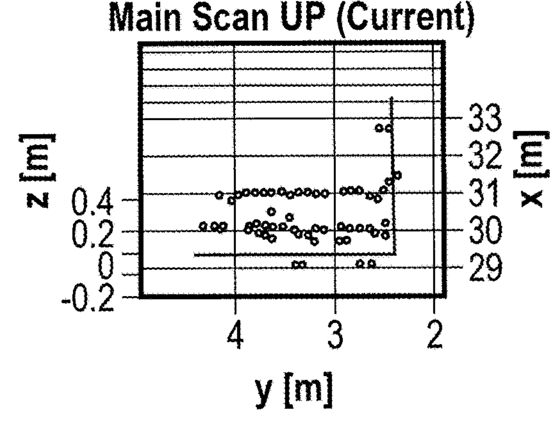
Figure 6F:
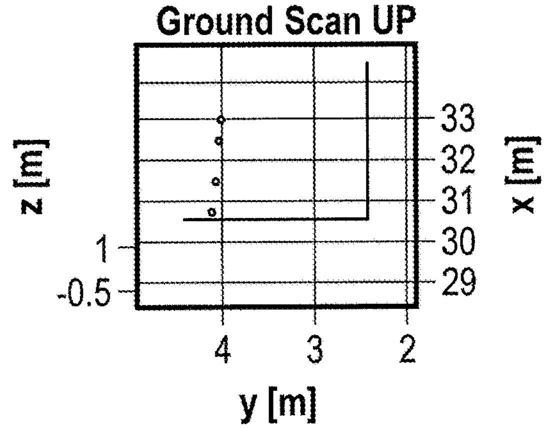
Figure 6F:
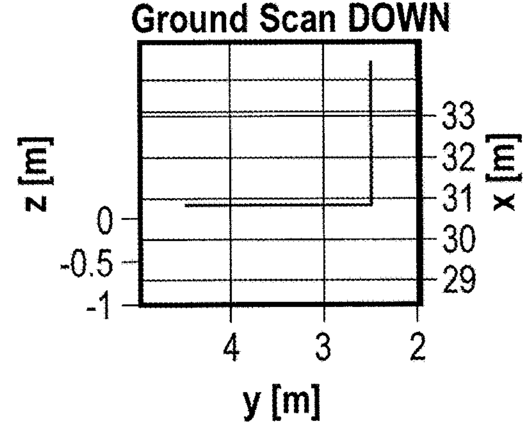

FIG. 4 is a block diagram illustrating an embodiment of a calibration system 40 for automatically performing a self-calibration procedure on at least a pair of adjacent sensors (e.g., sensors 12). The calibration system 40 may be a self-contained automated system that may be incorporated in an Electronic Control Unit (ECU) or Central Processing Unit (CPU), which may in turn be part of one or more computer systems or control systems of an autonomous object (e.g., vehicle 10). In the illustrated embodiment, the calibration system 40 may be a digital computing device that generally includes a processing device 42, a memory device 44, scene sensing device 46 (e.g., sensors 12), and a database 50. It should be appreciated that FIG. 4 depicts the calibration system 40 in a simplified manner, where some embodiments may include additional components and suitably configured processing logic to support known or conventional operating features. The components (i.e., 42, 44, 46, 50) may be communicatively coupled via a local interface 52. The local interface 52 may include, for example, one or more buses or other wired or wireless connections. The local interface 52 may also include controllers, buffers, caches, drivers, repeaters, receivers, among other elements, to enable communication. Further, the local interface 52 may include address, control, and/or data connections to enable appropriate communications among the components 42, 44, 46, 50.

It should be appreciated that the processing device 42, according to some embodiments, may include or utilize one or more generic or specialized processors (e.g., microprocessors, ECUs, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 42 may also include or utilize stored program instructions (e.g., stored in hardware, software, and/or firmware) for control of the calibration system 40 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 44 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 44 may incorporate electronic, magnetic, optical, and/or other types of storage media. The memory device 44 may have a distributed architecture, where various components are situated remotely from one another, but can be accessed by the processing device 42.

The memory device 44 may include a data store, database (e.g., database 50), or the like, for storing data. In one example, the data store may be located internal to the calibration system 40 and may include, for example, an internal hard drive connected to the local interface 52 in the calibration system 40. Additionally, in another embodiment, the data store may be located external to the calibration system 40 and may include, for example, an external hard drive connected to the scene sensing devices 46 (e.g., SCSI or USB connection). In a further embodiment, the data store may be connected to the calibration system 40 through a vehicle network and may include, for example, a network attached file server. The database 50 may store calibration data, information about each of the scene sensing devices Software stored in the memory device 44 may include one or more programs, each of which may include an ordered listing of executable instructions for implementing logical functions. The software in the memory device 44 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

The calibration system 40 may include an automatic calibration unit 54, which may be configured in any combination of hardware, software, and/or firmware. As shown, the automatic calibration unit 54 is stored as software or firmware in the memory device 44. In other embodiments, the automatic calibration unit 54 may be at least partially stored in the processing device 42 as hardware.

Moreover, some embodiments may include non-transitory computer-readable media having instructions stored thereon for programming or enabling a computer, server, processor (e.g., processing device 42), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 42 or other suitable circuitry or logic). For example, when executed, the instructions may cause or enable the processing device 42 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 42), or any suitable combination thereof. Software/firmware modules may reside in the memory device 44, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

In some alternative embodiments, the calibration system 40 may further includes Input/Output (I/O) interfaces (not shown) for receiving user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

Also, other alternative embodiments of the calibration system 40 may include a network interface or external interface, which may be used to enable the calibration system 40 to communicate over a network, the Internet, a Wide Area Network (WAN), a Local Area Network (LAN), Wi-Fi network, and the like. The network interface may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface may include address, control, and/or data connections to enable appropriate communications to external equipment (e.g., in a shop). Thus, although the calibration system 40 may be a self-contained system working independently of other nearby objects (e.g., other vehicles) to calibrate its own sensors, the calibration system 40 may further include external communication devices for communicating the results of the self-calibration to management systems, test facilities, or the like.

FIG. 5 is a diagram illustrating an embodiment of a cross-sensor calibration technique 60, which may be implemented by any suitable calibration system (e.g., calibration system 40) that may operate on a device (e.g., vehicle 10) having multiple sensors arranged such that at least two of the sensors have some commonality in a reference object captured and/or overlap in their sensing or viewing scope. Sensors 62*a*, 62*b* (e.g., sensors 12*a*, 12*b*) may be arranged in a substantially fixed relationship with respect to each other and may be configured to view the same or similar scene 64 at different times (or an overlapped portion of two scenes at the same time).

In this embodiment, the first sensor 62*a* may be configured as a reference sensor. For example, the reference sensor may represent a sensor that has already been calibrated and/or has a greater likelihood than other sensors of being displaced or misaligned during use of the vehicle 10 or other object (e.g., movable or stationary object) on which the sensors 62*a*, 62*b* are incorporated. The reference sensor (i.e., sensor 62*a*) is configured to acquire a mapping 66 that is a mapping of the scene 64 from the perspective of the reference sensor.

The second sensor 62*b* may be configured as a sensor that is intended to be calibrated using the cross-sensor calibration technique 60. The second sensor 62*b* acquire information of the scene 64 and supplies this information to a calibration estimation module 68, which also receives the mapping 66. The calibration estimation module 68 is configured to compare the two mappings. In some embodiments, the calibration estimation module 68 may take into account the different viewing perspectives of the two sensors 62*a*, 62*b*. At this point, the calibration estimation module 68 may be configured to produce adjustment parameters needed to compensate for the differences in the mappings and then apply these adjustment parameters back to the sensor 62*b*. The cross-sensor calibration technique 60 can take real-time images (or scenes 64) simultaneously acquired over time by the two sensors 62*a*, 62*b* and make adjustments to the settings (e.g., processing settings) of the sensor 62*b* to re-align the sensor 62*b* with a factory-calibrated setting.

In some embodiments, the calibration estimation module 68 may determine if the difference in scenes acquired by the two sensors 62*a*, 62*b* is too big (e.g., if the sensor 62*b* under test has been jostled significantly from its original position and/or orientation). If this is the case, the calibration estimation module 68 may be configured to not only attempt to calibrate the sensor 62*b* as much as possible, but also to send a warning or alert signal (e.g., to the driver via a dashboard indicator) signaling that the sensor 62*b* has been significantly moved from its factory position/orientation and needs to be physically reinstalled or remounted.

Therefore, the present disclosure provides systems and methods to allow the exchange of measurement information between two sensors that have similar observation views at multiple points in time where the information of the sensors is substantially synchronized in time to ensure that the sensors are viewing the same objects within the scene. Again, the sensors include a reference sensor 62*a* (e.g., already calibrated or auto-calibrated) and a target sensor 62*b* (e.g., sensor to be calibrated). The sensors 62*a*, 62*b* share at least a portion of the same view (e.g., scene 64) or a portion of a scene having an overlap to some degree and/or both capture a common reference object. Normally, the common reference object and/or overlap portion is the 2D area or 3D space that can be compared and used for calibration. The sensors 62*a*, 62*b* may have a preset orientation when installed on a test object (e.g., vehicle 10) where their arrangement may include sensing spaces/zones (e.g., including at least the scene 64) that overlap to some degree or cover the same area at different times.

In the environment of vehicle sensing, the sensors 62*a*, 62*b* may be Advanced Driver-Assistance Systems (ADAS) and/or Autonomous Driving (AD) System sensors normally used on a vehicle for assisting a driver with the operation of the vehicle. The reference sensor 62*a* may be configured to create a "feature map" of a scene 64 (e.g., referred to as the mapping 66) and/or one or more objects within the scene 64, whereby the objects therein may be localized in 3D space. The observation (or measurement) of the target sensor 62*b* is used by the calibration estimation module 68 to match (or compare) this observation against the feature map, such as to find the common and/or overlapping sections. Then, the calibration estimation module 68 may be configured to predict the locality of the objects in 3D space and determine a difference in a "distance" (or angle, orientation, or the like) from an "ideal" or "true" orientation representing the observation of the reference sensor 62*a*. The calibration estimation module 68 creates or optimizes calibration parameters based on this distance to minimize this parameter. Using the optimized calibration parameters, the calibration estimation module 68 can calibrate the target sensor 62*b* as needed.

According to some embodiments, mapping 66 or feature map may be the result of a sensor creating an observed scene/material reflective property map, such as an Echo-Pulse-Width (EPW) map or the like, that may be used to define the mapping 66 and may include one or more external objects within the scene 64. Also, the EPW map be acquired for movable scenes as a vehicle is traveling down a road where the EPW maps are obtained over a certain time period (e.g., 10-20 seconds). For example, the one or more external objects may be one or more nearby vehicles within the subsequent or overlapping scenes. The one or more external objects may be tracked (e.g., using the calibration estimation module 68 or other processing component) over a period of time. As used herein, the EPW map more broadly refers to any observed scene/material reflective property map or the like. For a camera, for example, reflective properties of a scene correlate with variations in pixel color and intensity. For a lidar, for example, reflective properties (for the optical wave length of the laser) correlate with measured irradiance/intensity. Thus, in the illustrative embodiment provided herein, EPW is correlated with intensity in that, roughly, intensity is the integral under the echo pulse signal, and EPW is the width (i.e., time duration) of the echo pulse signal.

Cross-sensor calibration for simultaneous capture and a non-moving vehicle is sometimes used in end-of-line calibration. In the present case, one can build a map using a reference for some time (i.e., accumulate information), then use frames from a target sensor to match against that map in a subsequent stage. This can work even if there is no overlap between the sensors. For example, imagine a forward facing reference sensor mapping a pole as one drives by. Once the pole is passed by, a rear-facing target sensor will see that same pole and have a map available (from the reference calibrated sensor), including how the pole is supposed to look like (e.g., height, inclination, position, . . . ), from which it can calibrate itself. The temporal-spatial consistency of this approach is maintained using ego-vehicle state estimation (i.e., one knows how ego-vehicle is moving in 3D space from GNSS, IMU, wheel odometry, and other measurements). This enables map accumulation over time while a vehicle is driving.

The cross-sensor calibration technique 60 of FIG. 5 may include determine calibration parameters for making scene-viewing adjustments to the processing algorithms of the sensor 62*b*. The scene-viewing adjustments may include adjustments or calibrations with respect to roll and/or pitch. In other embodiment, calibration may also be made with respect to a yaw parameter. As shown in FIG. 3, the sensors 62*a*, 62*b* may be used to observe any two of the view scopes 26, 28, 30. For example, if the sensors 62*a*, 62*b* view scopes 26, 28, the scenes may be offset slightly in a lateral direction and/or a vertical direction.

The reference sensor 62*a* is self-calibrated before calibrating other sensor 62*b* or other sensors. This may be repeated until all of sensors of a set are calibrated with respect to each other, hence the term "cross-sensor." The calibration is done in the field while the vehicle 10 (e.g., vehicle, test vehicle, ego vehicle, etc.) is traveling along a road with observable objects (e.g., nearby vehicles, signs, railing, trees, bridges, overpasses, road markings, etc.). Calibration may be performed while the vehicle is stationary or in motion using real-world objects as references within the respective scenes.

It may be understood that the cross-sensor calibration technique 60 may be a re-calibration of a previously-performed factory calibration to obtain factory-calibrated parameters that can be used a baseline and stored in the database 50. In this respect, the re-calibration can account for inadvertent movement (e.g., relative displacement, an angled roll rotation, an angled pitch rotation, an angled yaw rotation, mis-alignment, re-orientation, etc.) of the target sensor 62*b* during the lifetime of the vehicle 10. Again, measurement of initial roll, pitch, and yaw of each sensor may be stored in the database 50 for later reference when needed. If one or more of roll, pitch, or yaw is off from a factory setting by a certain degree greater than a certain threshold, then the calibration estimation module 68 may be configured to indicate an error (e.g., on a dashboard) while trying to calibrate as much as possible. Such an error may also indicate that there may be blind spots in the set of sensors that could lead to missing certain objects or potential events that may normally require automated actuation for the safe operation of the vehicle.

In some embodiments, a sensor (e.g., sensor 62*a*) may be used as a reference sensor when it is oriented with a more downward directed view (e.g., view scope 28 shown in FIG. 3). For example, the scene at this lower view can be used to detect characteristics of the road to self-calibrate in the field. Self-calibration using the road may average road tilt over time to determine a horizontal frame and may also use an average pitch angle to determine a vertical frame.

Also, according to some embodiments, the calibration system 40 and/or cross-sensor calibration technique 60 may include a user interface for enabling calibration by a trained calibration professional. The user interface may be configured to show one or more charts, tables, graphs, videos, snapshots, measurements, etc. As shown with respect to FIGS. 6A-6F, the user interface may include video that is viewable in a particular application and may be color-coded to indicate certain characteristics. The user interface may also show lines, points, and/or other features representing objects (e.g., the road, nearby vehicles, lane markings, safety railing, etc.) in each particular scene. The calibration system 40 and/or cross-sensor calibration technique 60 may measure distance and velocity parameters in addition to image data from viewable observation points which can then be used to create the scene (e.g., scene 64).

FIGS. 6A-6F show an example of a set of screenshots of a user interface 102 for illustrating various characteristics of the scenes. The screenshots show sets of sensor information obtained over a period of time (e.g., about twenty seconds) and separated by about four seconds. It should be noted, however, that the observations may be acquired multiple times per second to produce a video, whereby the information from the video can be used to detect scenes that are used for calibration. After a certain amount of time, it can be seen that the accuracy of the measurements increases based on acquiring more data points.

Figure 7:
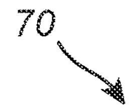
FIG. 7 is a flow diagram illustrating a process for self-calibrating a set of sensors arranged in a fixed orientation with respect to each other, according to various embodiments.

FIG. 7 is a flow diagram illustrating an embodiment of a process 70 for performing self-calibrating procedures on a set of sensors arranged in a fixed orientation with respect to each other. In the illustrated embodiment, the process 70 includes the step of obtaining a first mapping of a first observable scene from a first scene sensing device and a second mapping of a second observable scene from a second scene sensing device, as indicated in block 72. In particular, the first and second scene sensing devices are positioned on a test object in a substantially fixed relationship with respect to each other. Also, the first and second observable scenes have common reference objects and/or overlapping portions. The process 70 further includes the step of comparing the common reference object and/or overlapping portion of the first mapping with the common reference object and/or overlapping portion of the second mapping to determine a difference, as indicated in block 74. Also, the process 70 includes the step of creating calibration parameters, based on the difference, for calibrating the second scene sensing device, as indicated in block 76. Finally, firmware or other software running on the ADAS/AD ECU provides/performs a calibration instruction/procedure for the associated sensor using the created calibration parameters, as indicated in block 78.

According to additional embodiments with respect to the process 70, the test object may be a vehicle, and the first and second scene sensing devices may be configured to observe scenes nearby the vehicle. The second scene sensing device may be calibrated while the vehicle is in operation. In some embodiments, the first scene sensing device may be directed to view a portion of a road on which the vehicle is traveling. In this case, the process 70 may further include using characteristics of the road to perform a self-calibration procedure on the first scene sensing device.

In addition, the first and second mappings may be observed by the first and second scene sensing devices at substantially the same time. The first scene sensing device may be configured to create a feature mapping of the scene having one or more observable objects. The process 70 may further include localizing the objects in three-dimensional (3D) space and predicting the locality of the objects in 3D space to determine the difference. The step of creating the calibration parameters may include producing roll and pitch calibration parameters.

Furthermore, the first scene sensing device may be a pre-calibrated sensor used as a reference sensor and the second scene sensing device may be a target sensor. Some calibration systems utilizing the process 70 may further comprise one or more additional scene sensing devices. In this case, the calibrated second scene sensing device may be used as a reference sensor for the one or more additional scene sensing devices. Also, the second scene sensing device may be calibrated with respect to an initial factory-calibrated position and orientation.

The first and second scene sensing devices may include Advanced Driver-Assistance System (ADAS) and/or Autonomous Driving (AD) System sensors. For example, the ADAS and/or AD sensors may include one or more of cameras, image capture devices, lidar devices, and radar devices. Also, the first and second mappings may include an observed scene/material reflective property maps, such as Echo-Pulse-Width (EPW) maps or the like. In addition, one or more additional sensors may be used for measuring one or more of distance and velocity to create the first and second observable scenes.

Therefore, the systems and methods of the present disclosure are configured to address the problem of calibrating sensors in the field during the lifetime of the vehicle, particularly in systems where vehicle-based sensors can be calibrated while the vehicle is on the road (or in the field). Because of the different fields of view of different sensors, conventional systems do no attempt to perform cross-sensor calibration, especially since the commonality or overlap of sensors is usually not considered in these conventional systems.

Nevertheless, the present disclosure addresses these issues, such as, for example, by exchanging measurement information between two sensors, assuming that one sensor (e.g., a reference sensor) is auto-calibrated beforehand or is more reliably pre-calibrated, and the other sensor (e.g., a target sensor) might be more easily dislodged or moved from its original position or may experience more difficulty with auto-calibration or self-calibration. For example, the reference sensor may create a feature map of an object or scene. Since the reference sensor is calibrated, that feature map can be accurately localized in 3D space. The target sensor matches its measurements against the feature map generated by the reference sensor. Given calibration parameters for the target sensor, the systems and methods can predict the locality of the features in 3D space. Consequently, the calibration parameters for the target sensor can be optimized to minimize the distance between a predicted feature locality from the target sensor measurement and a "true" feature locality from the reference sensor feature map.

In some embodiments, this approach may assume that the reference sensor and target sensor observe substantially the same object/scene simultaneously (or within a short period of time). The sensors may use motion information of the vehicle 10 (e.g., test vehicle, ego vehicle, etc.) to accomplish feature localization over time.

The systems and methods of the present disclosure may include embodiments that were motivated by real-world use cases where auto-calibration of two Scanning Lasers or lidars was performed. In this example, a "main" laser/lidar at the front right of the vehicle has a 0 degree pitch and a "ground" laser/lidar at the front left of vehicle has a 3.5 degree downward pitch. Due to the low vertical field of view (i.e., 3.2 degrees) and the low vertical resolution (i.e., four scan layers) of these sensors in this example, it was found to be difficult to calibrate roll and pitch for the main lidar. Calibrating roll and pitch were relatively easy for the ground lidar, as it was able to observe the road surface, which led to useful calibration constraints on the roll and pitch. The main lidar, however, would not observe the road surface, but rather nearby vehicles. etc. The measurements from vehicles do not easily lend themselves to accurate constraints in roll or pitch without making a priori (i.e., theoretical rather than observable) assumptions about the reflectivity properties and/or the height of the observed vehicle.

Therefore, the present disclosure provides embodiments that instead can calibrate the ground lidar (using road surface measurements) first. Then, as a target vehicle passes the vehicle, the ground lidar creates an observed scene/material reflective property map, such as an Echo-Pulse-Width (EPW) map or the like, of the rear of the target vehicle, which has higher values for reflective parts (e.g., license plates, rear lights, etc.). The target vehicle is then tracked in the main lidar. Knowing the location of the reflective parts of the vehicle, the main laser/lidar is able to estimate its roll and pitch so as to find the best match between its high-reflectivity measurements (or features) and the EPW map or the like.

Referring again to FIGS. 6A-6F, the screenshots (on a user interface) are taken from video that demonstrates the present methods for a single target vehicle 110 as it passes the vehicle. In practice, the systems and methods may accumulate the results from multiple passing vehicles. In the bottom left of the screenshots is the EPW map created by the ground lidar. The plot on the right shows the estimated roll and pitch for the main lidar. One passing vehicle creates a "line"-shaped hypothesis in the roll-pitch plane. A vehicle passing on the other side would create another "line"-shaped hypothesis. The intersection of these lines may represent a maximum likelihood estimate for roll and pitch. The point clouds from the main and ground lidar may be color-coded by their EPW values in the screenshots.

The approach can be extended to other sensors, such as imaging radars or cameras. For cameras, the method may involve matching visual features across cameras to establish calibration constraints. For imaging radar, geometrical features such as distance and velocity can be used.

Therefore, the present disclosure describes various aspects that are believed to be novel with respect to conventional systems. For example, the embodiments of the present disclosure may use cross-sensor feature maps to auto-calibrate a sensor, which has not been demonstrated in conventional systems related to lidar or radar data. Also, the present disclosure provides procedures of matching observable features across multiple cameras on a vehicle, where auto-calibration may be performed. Conventional ADAS and AD systems do not use cameras in this manner. Furthermore, the present disclosure is configured to use a dynamic object (e.g., another vehicle) for auto-calibration, which is believed to be novel with respect to conventional systems. Although static objects are often used to auto-calibrate one static sensor, the conventional systems suffer from having to make a priori assumptions about the object properties, which may be difficult to know or validate in practice.

Therefore, the present disclosure provides specific advantages over these conventional systems. For example, with more and more advanced autonomy features, the need for more sensors and their auto-calibration grows as well. It is demonstrated in the present disclosure that these automated vehicles, having more and more sensors, would benefit with the opportunity for using cross-sensor information as described herein. The use of cross-sensor information as described in the present disclosure may, in some cases, be the only practical option to auto-calibrate sensors, depending on their capabilities and mounting location.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A calibration system, comprising:

a first scene sensing device;

a second scene sensing device, wherein, the first scene sensing device and the second scene sensing device are positioned on a vehicle in a fixed relationship with respect to each other;

a processing device; and a memory device configured to store a computer program having instructions that, when executed, enable the processing device to:

obtain, by the first scene sensing device, a first mapping of a first observable scene that includes a target vehicle that passes the vehicle, obtain, by the second scene sensing device, a second mapping of a second observable scene that includes the target vehicle, determine a difference between the first mapping and the second mapping based on a comparison of the target vehicle in the first mapping and in the second mapping, based on the determined difference, create calibration parameters for calibrating the second scene sensing device, and automatically calibrate the second scene sensing device using the created calibration parameters.

2. The calibration system of claim 1, wherein the target vehicle is in the first observable scene and in the second observable scene.

3. The calibration system of claim 1, wherein the first and second scene sensing devices are configured to observe scenes nearby the vehicle.

4. The calibration system of claim 3, wherein the second scene sensing device is calibrated while the vehicle is in operation.

5. The calibration system of claim 3, wherein the first scene sensing device is directed to view a portion of a road on which the vehicle is traveling, and wherein the instructions further enable the processing device to use characteristics of the road to perform a self-calibration procedure.

6. The calibration system of claim 1, wherein the first and second mappings are observed by the first and second scene sensing devices one of at substantially the same time, and at substantially different times.

7. The calibration system of claim 1, wherein the first scene sensing device is configured to create a feature mapping of the first observable scene having one or more observable objects, wherein the instructions further enable the processing device to localize the observable objects in three-dimensional (3D) space and predict the locality of the one or more observable objects in the 3D space to determine the difference.

8. The calibration system of claim 1, wherein creating the calibration parameters comprises producing roll and pitch calibration parameters.

9. The calibration system of claim 1, wherein the first scene sensing device is a pre-calibrated sensor used as a reference sensor and the second scene sensing device is a target sensor.

10. The calibration system of claim 9, further comprising one or more additional scene sensing devices, wherein the second scene sensing device is used as a reference sensor for the one or more additional scene sensing devices.

11. The calibration system of claim 1, wherein the second scene sensing device is calibrated with respect to an initial factory-calibrated position and orientation.

12. The calibration system of claim 1, wherein the first and second scene sensing devices comprise Advanced Driver-Assistance System (ADAS) and/or Autonomous Driving (AD) System sensors, and wherein the ADAS and/or AD sensors comprise one or more of perception sensors, cameras, image capture devices, lidar devices, and radar devices.

13. The calibration system of claim 1, wherein the first and second mappings comprise observed scene/material reflective property maps.

14. A method, comprising:

obtaining, from a first scene sensing device, a first mapping of a first observable scene that includes a first vehicle that passes a second vehicle;

obtaining, from a second scene sensing device, a second mapping of a second observable scene that includes the first vehicle passing the second vehicle, wherein the first and second observable scenes include a reference object;

generating, based on the first observable scene obtained by the first mapping, a first video of the first vehicle;

generating, based on the second observable scene obtained by the second mapping, a second video of the first vehicle;

comparing the first vehicle in the first video and in the second video to determine a difference;

based on the determined difference, creating calibration parameters for calibrating the second scene sensing device;

automatically calibrating the second scene sensing device using the created calibration parameters; and in response to determining that the second scene sensing device differs from an initial setting by more than a threshold, providing an alert signal indicating that the second scene sensing device has been displaced from the initial setting.

15. The method of claim 14, wherein the reference object is in the first observable scene and in the second observable scene.

16. The method of claim 14, wherein the second scene sensing device is automatically calibrated while the second vehicle is in operation.

17. The method of claim 14, wherein the first mapping and the second mapping are observed by the first and second scene sensing devices at one of at substantially the same time, and at substantially different times.

18. The method of claim 14, wherein the first scene sensing device is configured to create a feature mapping of the scene having one or more observable objects and the method further comprises:

enabling localization of the one or more observable objects in three-dimensional (3D) space; and predicting, based on the localization, locality of the one or more observable objects in the 3D space to determine the difference.

19. The method of claim 14, wherein creating the calibration parameters comprises producing roll and pitch calibration parameters.

20. The method of claim 14, wherein the first and second scene sensing devices comprise one or more of perception sensors, cameras, image capture devices, lidar devices, and radar devices used in one or more Advanced Driver-Assistance Systems (ADAS) and/or Autonomous Driving (AD) Systems.

21. A calibration system, comprising:

a first scene sensing device;

a second scene sensing device;

a rear-facing target sensor;

a processing device; and a memory device configured to store a computer program having instructions that, when executed, enable the processing device to in response to vehicles detected by rear-facing target sensor:

obtain, by the first scene sensing device, a first mapping of a first observable scene that includes a first passing vehicle passing a reference vehicle on a first side of the reference vehicle, obtain, by the second scene sensing device, a second mapping of a second observable scene that includes a second passing vehicle passing the reference vehicle on a second side of the reference vehicle, the second side opposite the first side, determine a difference between the first mapping and the second mapping based on a comparison of the first passing vehicle in the first mapping and the second passing vehicle in the second mapping, based on the determined difference, create roll and pitch calibration parameters for calibrating the second scene sensing device, and automatically calibrate the second scene sensing device using the created roll and pitch calibration parameters.

* * * * *